United States Patent
Kim et al.

(10) Patent No.: US 10,780,583 B2
(45) Date of Patent: Sep. 22, 2020

(54) SYSTEM AND METHOD OF CONTROLLING ROBOT

(71) Applicant: HANWHA PRECISION MACHINERY CO., LTD., Changwon-do (KR)

(72) Inventors: Seok Hwan Kim, Changwon-si (KR); Byung Chan Jung, Changwon-si (KR)

(73) Assignee: HANWHA PRECISION MACHINERY CO., LTD., Changwon-si (KR)

( * ) Notice: Subject to any disclaimer, the term of this patent is extended or adjusted under 35 U.S.C. 154(b) by 232 days.

(21) Appl. No.: 15/334,441

(22) Filed: Oct. 26, 2016

(65) Prior Publication Data

US 2017/0113350 A1 Apr. 27, 2017

(30) Foreign Application Priority Data

Oct. 26, 2015 (KR) .................. 10-2015-0148831

(51) Int. Cl.
*G06F 19/00* (2018.01)
*B25J 9/16* (2006.01)

(52) U.S. Cl.
CPC .................. *B25J 9/1682* (2013.01)

(58) Field of Classification Search
CPC ........ B25J 5/007; B25J 9/1633; B25J 13/085; B25J 13/088
USPC .................................. 700/245, 248
See application file for complete search history.

(56) References Cited

U.S. PATENT DOCUMENTS

| | | | | |
|---|---|---|---|---|
| 4,868,474 A | * | 9/1989 | Lancraft | G05B 19/4141 318/568.2 |
| 5,737,500 A | * | 4/1998 | Seraji | B25J 9/1643 318/568.11 |
| 2004/0240981 A1 | * | 12/2004 | Dothan | B65G 49/067 414/795.4 |
| 2007/0168082 A1 | | 7/2007 | Kim et al. | |
| 2007/0188116 A1 | * | 8/2007 | Aoyama | G05B 19/0421 318/77 |
| 2009/0036902 A1 | * | 2/2009 | DiMaio | A61B 34/10 606/130 |
| 2012/0130400 A1 | * | 5/2012 | Brock | A61B 34/71 606/130 |

(Continued)

FOREIGN PATENT DOCUMENTS

| | | |
|---|---|---|
| CN | 1372505 A | 10/2002 |
| CN | 101021727 A | 8/2007 |

(Continued)

OTHER PUBLICATIONS

Chinese Office Action dated Jun. 12, 2020 issued by the State Intellectual Property Office of People's Republic of China in Chinese Patent Application No. 201610948726.7.

*Primary Examiner* — Ronnie M Mancho
(74) *Attorney, Agent, or Firm* — Sughrue Mion, PLLC

(57) ABSTRACT

A robot control system includes: an interface configured to receive a user input; a controller configured to generate a motion command corresponding to the user input and a motion command group including the motion command, and generate hardware interpretable data by analyzing the motion command; and a driver configured to drive a motion of at least one hardware module based on the hardware interpretable data to be interpreted by the at least one hardware module.

19 Claims, 4 Drawing Sheets

(56) References Cited

U.S. PATENT DOCUMENTS

| | | | | |
|---|---|---|---|---|
| 2012/0237053 A1* | 9/2012 | Alam | ............... | H04L 12/00 381/80 |
| 2012/0328395 A1* | 12/2012 | Jacobsen | ............... | B25J 3/04 414/1 |
| 2014/0094968 A1* | 4/2014 | Taylor | ............... | B25J 13/006 700/257 |
| 2014/0276950 A1* | 9/2014 | Smaby | ............... | A61B 34/30 606/130 |
| 2016/0046023 A1* | 2/2016 | Nagendran | ............... | B25J 9/1689 700/248 |
| 2017/0274530 A1* | 9/2017 | Mottram | ............... | B25J 9/1633 |
| 2019/0083187 A1* | 3/2019 | Danitz | ............... | A61B 34/37 |

FOREIGN PATENT DOCUMENTS

| | | |
|---|---|---|
| CN | 101318329 A | 12/2008 |
| CN | 101890556 A | 11/2010 |
| CN | 102279766 A | 12/2011 |
| CN | 102540973 A | 7/2012 |
| CN | 104049573 A | 9/2014 |
| KR | 10-2007-0075957 A | 7/2007 |
| KR | 10-1237471 B1 | 2/2013 |
| KR | 10-1420852 B1 | 7/2014 |
| KR | 10-1644219 B1 | 8/2016 |

\* cited by examiner

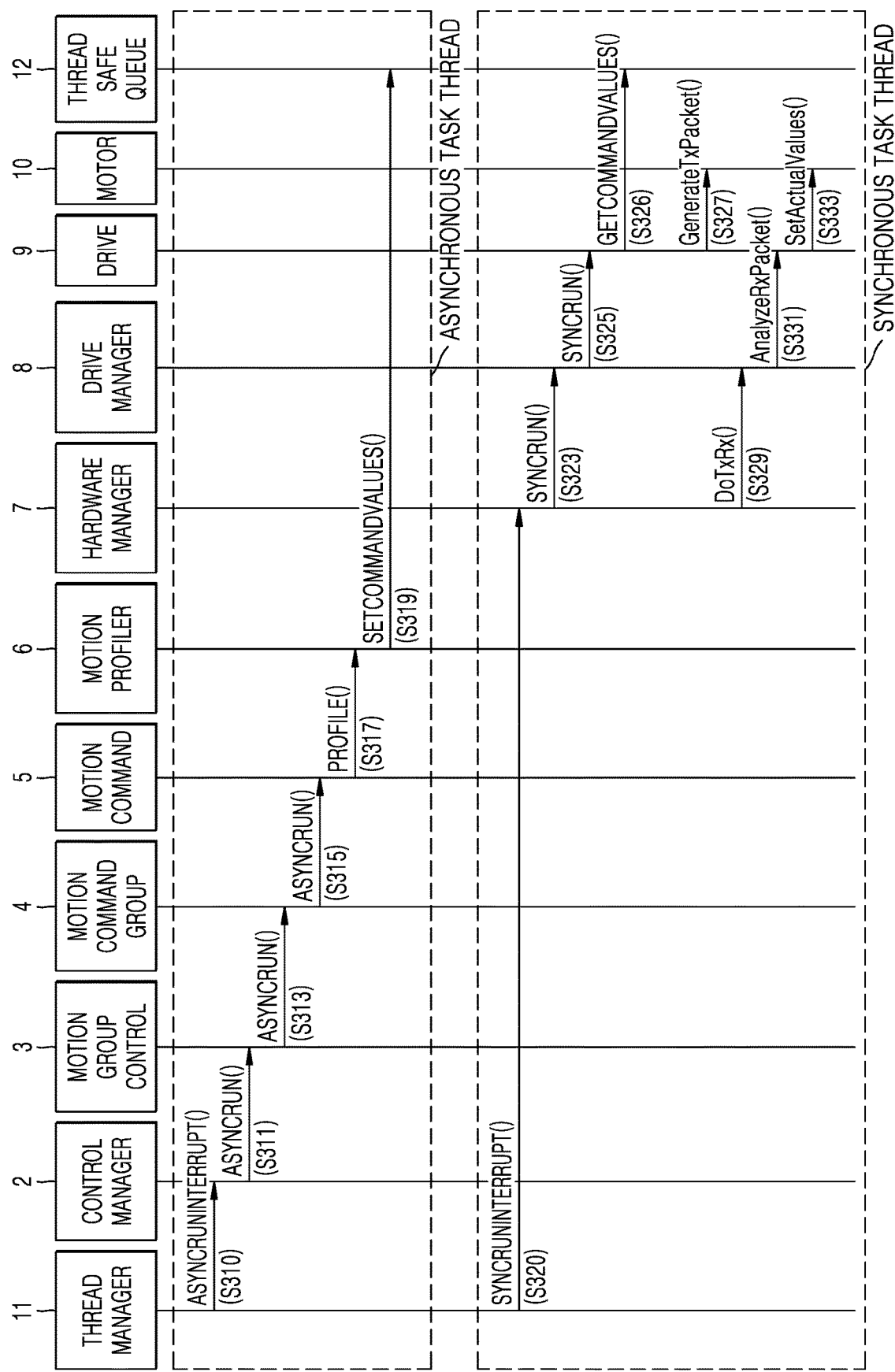

SYSTEM AND METHOD OF CONTROLLING ROBOT

CROSS-REFERENCE TO THE RELATED APPLICATION

This application claims priority from Korean Patent Application No. 10-2015-0148831, filed on Oct. 26, 2015, in the Korean Intellectual Property Office, the disclosure of which is incorporated herein in its entirety by reference.

BACKGROUND

1. Field

Apparatus and methods consistent with exemplary embodiments of the inventive concept relate to controlling a robot.

2. Description of the Related Art

Robot control application architectures may include a control layer for controlling a robot, a plan management layer for controlling a plurality of robots, and a goal management layer that is a top layer for determining an ultimate objective of a factory including the plurality of robots.

In general, a method of controlling a robot in the plan management layer has been researched. As a microcontroller has been equipped with a variety of functions, a research about various methods of controlling a robot in the control layer is demanded.

SUMMARY

Exemplary embodiments include a robot control system and method of controlling motions of a robot in a control layer.

Additional aspects will be set forth in part in the description which follows and, in part, will be apparent from the description, or may be learned by practice of the presented exemplary embodiments.

According to an exemplary embodiment, there is provided a robot control system which may include: an interface configured to receive a user input; a controller configured to generate a motion command corresponding to the user input and a motion command group including the motion command, and generate hardware interpretable data by analyzing the motion command; and a driver configured to drive a motion of at least one hardware module based on the hardware interpretable data to be interpreted by the at least one hardware module.

The controller may generate the motion command and the motion command group in non-real time and the hardware interpretable data in real time.

The motion command may include a final result value corresponding to the motion of the at least one hardware module.

The at least one hardware module may form one robot.

The motion command group may include a plurality of motion commands, the controller may simultaneously perform the plurality of motion commands included in the motion command group, and the driver may simultaneously drive motions of at least one hardware module forming each of a plurality of robots.

The controller may analyze the motion command in a non-cyclic manner and generate the hardware interpretable data in a cyclic manner.

The motion command may include a final result value of the motion of the at least one hardware module.

The at least one hardware module may form one robot.

The motion command group may include a plurality of motion commands, the controller may simultaneously perform the plurality of motion commands included in the motion command group, and the driver may simultaneously drive motion of at least one hardware module forming each of a plurality of robots.

The controller may call an asynchronous run interrupt function from a ThreadManager class to analyze the motion command in a non cyclic manner.

The controller may store the motion command in a ThreadSafeQueue class, according to the asynchronous run interrupt function.

The controller may call a synchronous run interrupt function from the ThreadManager class to generate the hardware interpretable data in a cyclic manner, and obtain the motion command from the ThreadSafeQueue class, according to the synchronous run interrupt function.

According to an exemplary embodiment, there is provided a robot control method of controlling a robot by a robot control system which includes an interface, a controller, and a driver. The method may include: receiving a user input through the interface: generating a motion command corresponding to the user input and a motion command group comprising the motion command, which is performed by the controller; generating hardware interpretable data by analyzing the motion command, which is performed by the controller; and driving a motion of at least one hardware module based on the hardware interpretable data, which is performed by the driver.

The controller may analyze the motion command in a non-cyclic manner and generate the hardware interpretable data in a cyclic manner.

The robot control method may further include simultaneously performing a plurality of motion commands included in the motion command group, which are by the controller, and simultaneously driving motions of at least one hardware module forming each of a plurality of robots, which is performed by the driver.

The motion command may include a final result value according to the motion of the at least one hardware module.

The generating the hardware interpretable data by analyzing the motion command may include: calling an asynchronous run interrupt function with respect to a ControlManager class from a ThreadManager class, which is performed by the controller, and storing the motion command in a ThreadSafeQueue class according to the asynchronous run interrupt function, which is performed by the controller.

The generating the hardware interpretable data by analyzing the motion command may include: calling a synchronous run interrupt function with respect to a HardwareManager class from a ThreadManager class, which is performed by the controller, and obtaining the motion command from the ThreadSafeQueue class, according to the synchronous run interrupt function, which is performed by the controller.

BRIEF DESCRIPTION OF THE DRAWINGS

These and/or other aspects will become apparent and more readily appreciated from the following description of the exemplary embodiments, taken in conjunction with the accompanying drawings, in which:

FIG. 4 is a flowchart of a hybrid robot control method according to an exemplary embodiment.

DETAILED DESCRIPTION

Figure 1:
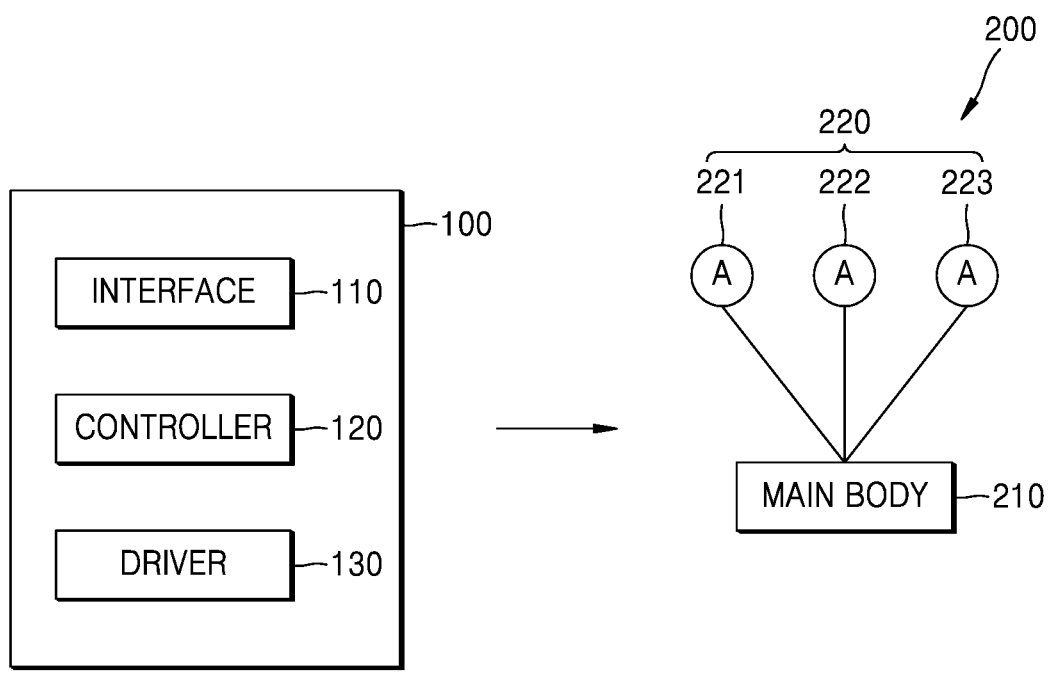
FIG. 1 is a block diagram of a robot control system according to an exemplary embodiment.

As the inventive concept allows for various changes and numerous embodiments, exemplary embodiments will be illustrated in the drawings and described in detail in the written description. However, this is not intended to limit the present inventive concept to particular modes of practice or the presented exemplary embodiments, and it is to be appreciated that all changes, equivalents, and substitutes that do not depart from the spirit and technical scope of the inventive concept are encompassed in the inventive concept. In the description of the exemplary embodiments, certain detailed explanations of the related art are omitted when it is deemed that they may unnecessarily obscure the essence of the inventive concept.

The exemplary embodiments will now be described more fully with reference to the accompanying drawings, in which, when detailed descriptions about related well-known functions or structures are determined to make the gist of the inventive concept unclear, the detailed descriptions will be omitted herein. Throughout the drawings, like reference numerals denote like elements.

FIG. 1 is a block diagram of a robot control system 100, according to an exemplary embodiment.

Referring to FIG. 1, the robot control system 100 according to the present exemplary embodiment may include an interface 110, a controller 120, and a driver 130. The robot control system 100 may determine a motion of a robot 200 that includes a main body 210 and an actuator 220.

The interface 110 receives a user input. The user input may include a final result value corresponding to the motion of the robot 200.

The controller 120 generates each of a motion command corresponding to the user input and a motion command group. The motion command group may correspond to the user input.

The controller 120 may set a motion command generation routine and a motion command group generation routine to be non-real time tasks.

The motion command may include a final result value corresponding to a motion of at least one hardware module constituting a robot. For example, the motion command may include at least one of a motion start position, a motion end position, a motion performing speed, and a jerk percent of three robot arms forming one robot.

The motion command group may include a plurality of motion commands. For example, the motion command group may include two motion commands related to two robots. The controller 120 may add a motion command to a motion command group.

The controller 120 may simultaneously perform a plurality of motion commands included in a motion command group. In other words, the controller 120 may simultaneously control motions of at least one hardware module forming each of a plurality of robots based on one motion command group. The motions of the respective robots simultaneously controlled and related to the one motion command group may be identical to or different from one another.

The controller 120 analyzes a motion command and generates data that is interpretable by hardware.

The controller 120 may set a motion command analysis routine and a hardware interpretable data generation routine to a real-time task. The controller 120 may assign a hardware interpretable data transmission routine to a real-time task.

According to an exemplary embodiment, the controller 120 may set a motion command analysis routine to an asynchronous task and a hardware interpretable data generation routine to a synchronous task. The controller 120 may set a hardware interpretable data generation routine to an asynchronous task and a hardware interpretable data transmission routine to a synchronous task.

The controller 120 may generate hardware interpretable data from the motion command by using a motion profiling algorithm. The motion profiling algorithm may be, for example, an algorithm for generating data corresponding to a position or speed of the actuator 220 so that the actuator 220 may move to a final position according to the motion command.

The driver 130 drives an operation of the at least one hardware module based on the hardware interpretable data generated by the controller 120.

When the controller 120 executes one motion command, the driver 130 may drive a motion of the at least one hardware module forming one robot.

When the controller 120 simultaneously executes a plurality of motion commands included in a motion command group, the driver 130 may simultaneously drive motions of at least one hardware module forming each of a plurality of robots.

The robot 200 may include a plurality of actuators 221, 222, and 223. For example, the actuators 221, 222, and 223 may form a plurality of joints of a robot arm. In the following description, a motor is a sort of the actuator 220.

The controller 120 may independently process a non-real time task and a real-time task. In detail, the controller 120 may set routines that are not necessarily to be executed within a limited time to a non-real time task, and routines that are to be necessarily executed within a limited time to a real-time task.

The controller 120 may execute altogether an asynchronous task thread that performs a non-real time task and a synchronous task thread that performs a real-time task.

A non-real time robot control method and a real-time robot control method are described below in detail with reference to FIGS. 2 and 3, respectively.

Figure 2:
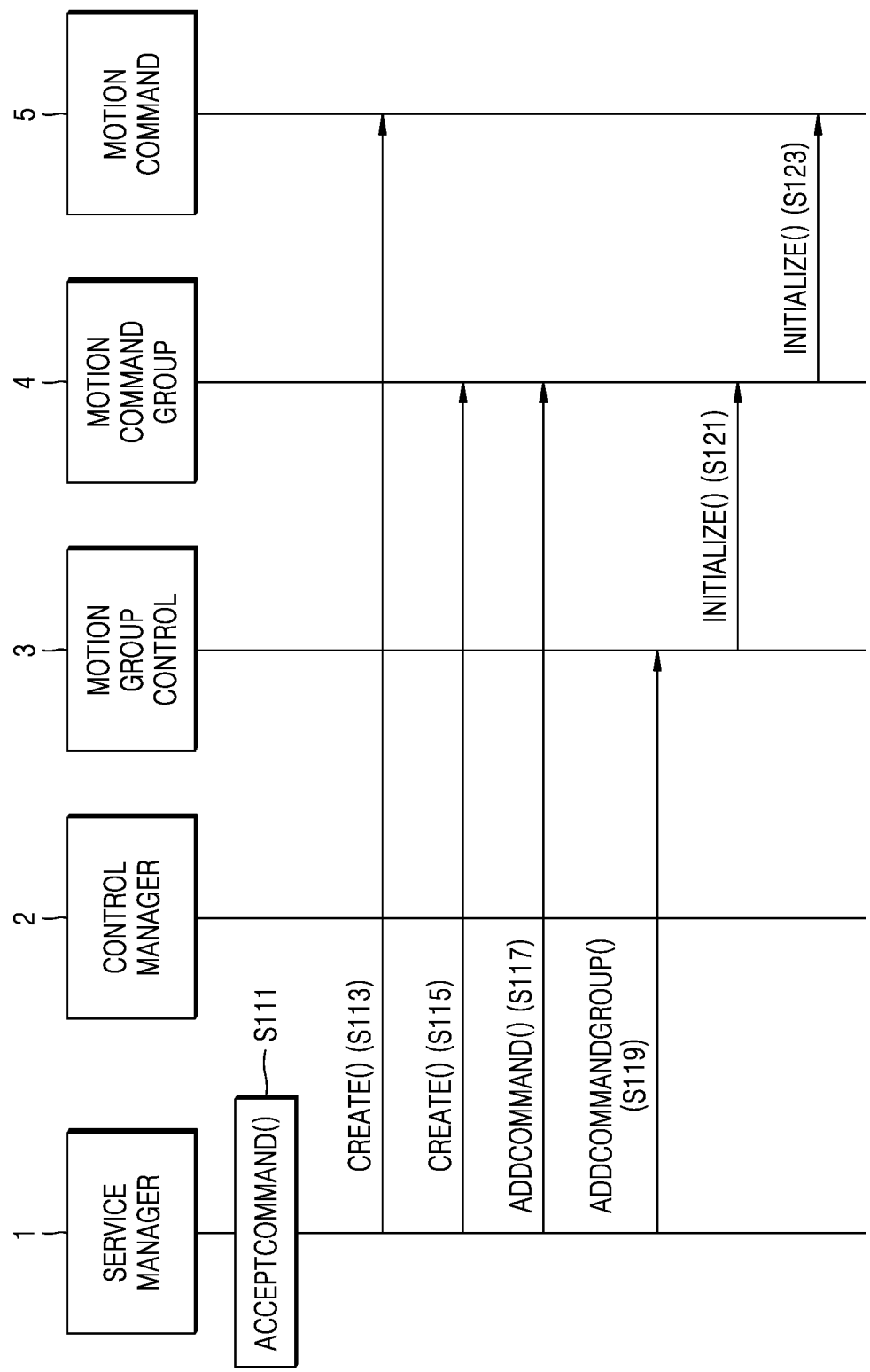
FIG. 2 is a flowchart of a non-real time robot control method according to an exemplary embodiment.

FIG. 2 is a flowchart of a non-real time robot control method, according to an exemplary embodiment.

Referring to FIGS. 1 and 2, the controller 120 may call a function from each of a ServiceManager class 1, a ControlManager class 2, a MotionGroupControl class 3, a MotionCommandGroup class 4, and a MotionCommand class 5 so that the robot 200 may perform a non-real time task.

The ServiceManager class 1 is a class set to perform communications with an external system. The ServiceManager class 1 may include functions to communicate with the ControlManager class 2. When the robot control system 100 of FIG. 1 is developed, the ServiceManager class 1 characteristically includes logics to communicate with an external system.

Figure 3:
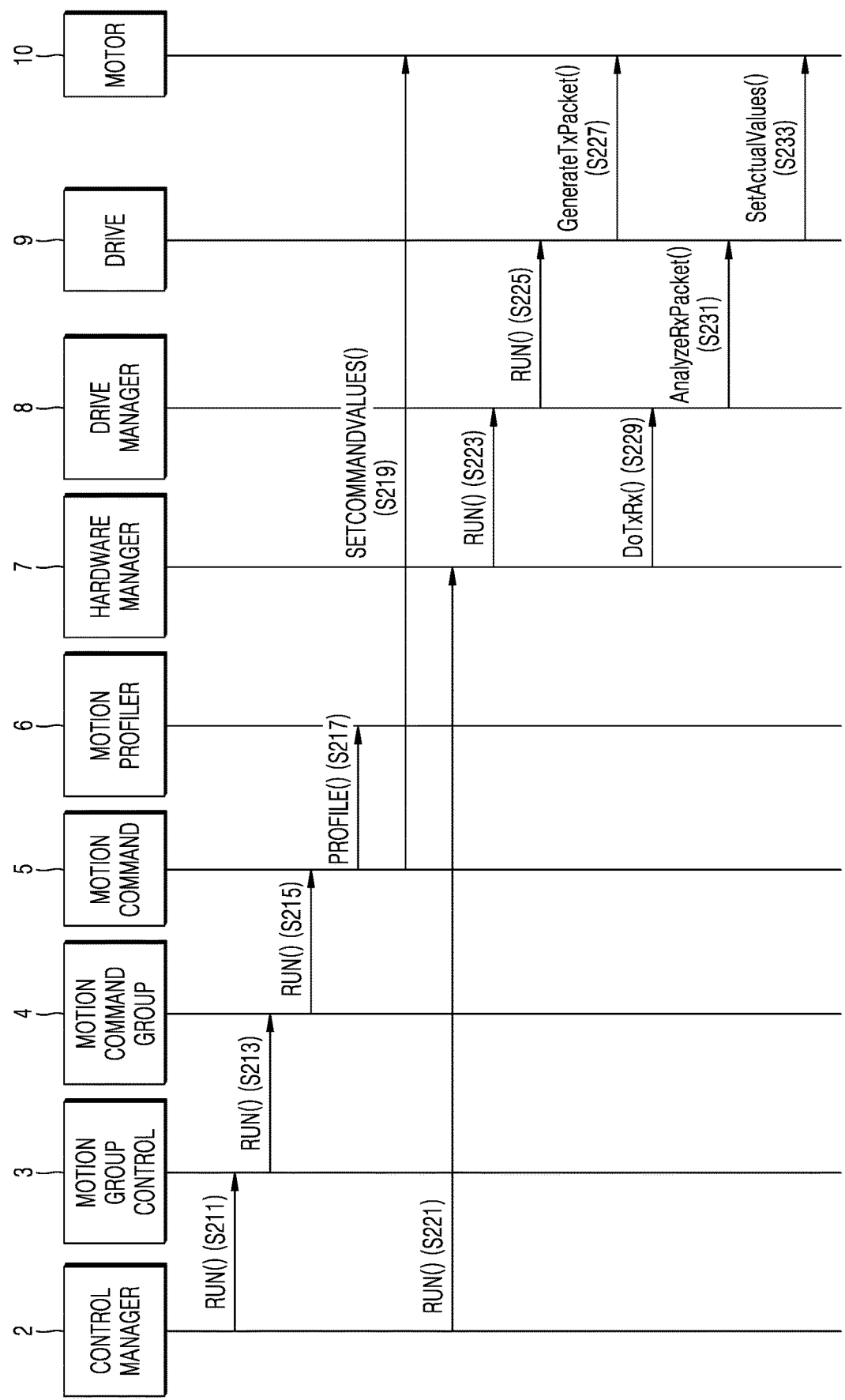
FIG. 3 is a flowchart of a real-time robot control method according to an exemplary embodiment.

The ControlManager class 2 is a class set to communicate with the ServiceManager class 1 or a HardwareManager class 7 of FIG. 3.

The MotionGroupControl class 3 is a class set to manage and execute the MotionCommandGroup class 4.

The MotionCommandGroup class 4 is a class set to manage and execute a plurality of motion commands.

The MotionCommand class 5 is a class set to manage and execute a motion command. The motion command is a minimum unit for describing a motion of a robot, and may include at least one parameter to complete the motion of a robot. The at least one parameter to complete the motion of a robot may be, for example, a motion start position, a motion end position, motion performing speed, and a jerk percent of at least one robot arm included in one robot.

First, the interface 110 receives a user input. When the user input is received through the interface 110, the controller 120 calls an AcceptCommand( ) function of the ServiceManager class 1 (S111).

Next, the controller 120 generates a motion command corresponding to the user input. To this end, the controller 120 calls a Create( ) function of the ServiceManager class 1 and generates a motion command that is managed and executed by the MotionCommand class 5 (S113).

The controller 120 generates a motion command group corresponding to the user input. To this end, the controller 120 calls the Create( ) function of the ServiceManager class 1 and generates a motion command group that is managed and executed by the MotionCommandGroup class 4 (S115).

Next, the controller 120 adds the motion command to the motion command group. In this state, the controller 120 calls an AddCommand( ) function of the ServiceManager class 1 and adds the motion command of the MotionCommand class 5 to the MotionCommandGroup class 4 (S117).

Next, the controller 120 calls an AddCommandGroup( ) function of the ServiceManager class 1 and sends the motion command group of the MotionCommandGroup class 4 to the MotionGroupControl class 3 (S119).

Next, the controller 120 calls an Initialize( ) function of the MotionGroupControl class 3 and initializes the MotionCommandGroup class 4 (S121), and calls an Initialize( ) function of the MotionCommandGroup class 4 and initializes the MotionCommand class 5 (S123).

Since the routines illustrated in FIG. 2 take much time and the time spent for each routine is difficult to estimate, and it is not necessary to execute the routines in real time, the routines may be set to be non-real time tasks.

In the following description, descriptions about the same features described above are simplified or omitted.

FIG. 3 is a flowchart of a real-time robot control method, according to an exemplary embodiment.

Referring to FIGS. 1 and 3, the controller 120 may call a function from each of the ControlManager class 2, the MotionGroupControl class 3, the MotionCommandGroup class 4, the MotionCommand class 5, a MotionProfiler class 6, a HardwareManager class 7, a DriveManager class 8, a Drive class 9, and a Motor class 10 so that the robot 200 may perform a real-time task.

The Motion Profiler class 6 is a class relative to an algorithm for analyzing at least one parameter included in a motion command.

The HardwareManager class 7 is a class set to communicate with the ControlManager class 2.

The DriveManager class 8 is a class to indicate a logical relationship between drives. The logical relationship between drives may be about, for example, how many drives are connected through a network.

The Drive class 9 is a class set to manage a motor(s) connected to the drive. For example, one drive may manage one motor or one drive may manage a plurality of motors.

The Motor class 10 is a class set to generalize a motor. In other words, the Motor class 10 may indicate a general motor state. The general motor state may signify a position, speed, acceleration, and error state of a motor.

The following routines such as motion profiling and network packet exchange may be processed as real-time tasks.

The controller 120 generates hardware interpretable data by analyzing each of a plurality of motion commands included in the motion command group.

To this end, first, the controller 120 calls a Run( ) function of the ControlManager class 2 with respect to the MotionGroupControl class 3 (S211), a Run( ) function of the MotionGroupControl class 3 with respect to the MotionCommandGroup class 4 (S213), and a Run( ) function of the MotionCommandGroup class 4 with respect to the MotionCommand class 5 (S215).

Next, the controller 120 calls a Profile( ) function of the MotionCommand class 5 with respect to the Motion Profiler class 6 (S217). As a result, the controller 120 may calculate at least one parameter included in the motion command.

Then, the controller 120 calls a SetCommnadValues( ) function of the MotionCommand class 5 with respect to the Motor class 10 (S219). As a result, the controller 120 may store the motion command in the Motor class 10.

The controller 120 calls the Run( ) function of the ControlManager class 2 with respect to the HardwareManager class 7 (S221), a Run( ) function of the HardwareManager class 7 with respect to the DriveManager class 8 (S223), and a Run( ) function of the DriveManager class 8 with respect to the Drive class 9 (S225).

Next, the controller 120 calls a GenerateTxPacket( ) function of the Drive class 9 with respect to the Motor class 10 (S227). As a result, the controller 120 may generate a packet by obtaining the motion command from the Motor class 10.

Next, the controller 120 calls a DoTxRx( ) function of the HardwareManager class 7 with respect to the DriveManager class 8 (S229). As a result, the controller 120 may exchange packets through the network.

Next, the controller 120 calls an AnalyzeRxPacket( ) function of the DriveManager class 8 with respect to the Drive class 9 (S231) and a SetActualValues( ) function of the Drive class 9 with respect to the Motor class 10 (S233). As a result, the controller 120 may analyze received packets and store an actual value about a motor state provided from the received packets in the Motor class 10.

Accordingly, the controller 120 may simultaneously drive motions of at least one hardware module, for example, a motor, forming each of the robots, based on the data stored in the Motor class 10. In this state, motions of respective robots controlled by the controller 120 may be identical to or different from one another.

Since the routines illustrated in FIG. 3 need to be executed in real time, the routines may be set to be real-time tasks.

In the following description, a non-cyclic robot control method and a cyclic robot control method are described in detail with reference to FIG. 4.

FIG. 4 is a flowchart of a hybrid robot control method, according to an exemplary embodiment.

Referring to FIGS. 1 and 4, the controller 120 may call a function from each of a ThreadManager class 11, the ControlManager class 2, the MotionGroupControl class 3, the MotionCommandGroup class 4, the MotionCommand class 5, the MotionProfiler class 6, the HardwareManager class 7, the DriveManager class 8, the Drive class 9, the Motor class 10, and a ThreadSafeQueue class 12 so that the robot 200 may perform an asynchronous task and a synchronous task.

The ThreadManager class 11 is a class set to manage an asynchronous task thread and a synchronous task thread.

The ThreadSafeQueue class 12 is a class set to store asynchronous data.

The controller 120 may call an asynchronous run interrupt function from the ThreadManager class 11 to analyze a motion command in a non-cyclic manner. As a result, the controller 120 may manage the following operations of S311 to S319 as an asynchronous task thread.

In detail, the controller 120 may call an AsyncRunInterrupt( ) function of the ThreadManager class 11 with respect to the ControlManager class 2 (S310). In other words, the controller 120 may call an asynchronous run interrupt function of the ThreadManager class 11 with respect to the ControlManager class 2.

Next, the controller 120 call an AsyncRun( ) function of the ControlManager class 2 with respect to the MotionGroupControl class 3 (S311), an AsyncRun( ) function of the MotionGroupControl class 3 with respect to the MotionCommandGroup class 4 (S313), and AsyncRun( ) function of the MotionCommandGroup class 4 with respect to the MotionCommand class 5 (S315).

Next, the controller 120 calls a Profile( ) function of the MotionCommand class 5 with respect to the Motion Profiler class 6 (S317). Since the Profile( ) function of the MotionCommand class 5 is a response to the AsyncRun( ) function of the MotionCommandGroup class 4, the Profile( ) function may be called at a certain time point.

The controller 120 calls a SetCommnadValues( ) function of the Motion Profiler class 6 with respect to the ThreadSafeQueue class 12 (S319). In other words, the controller 120 may set a motion command in the ThreadSafeQueue class 12 corresponding to the asynchronous run interrupt function.

In other words, the controller 120 may analyze the motion command in a non-cyclic manner and store the motion command in the Motor class 10 at a certain time point.

According to the present embodiment, since the operations of S311 to S319 are asynchronously performed, the influence of the operations of S311 to S319 on the cyclicity of a synchronous task thread may be reduced.

The controller 120 may call a synchronous run interrupt function from the ThreadManager class 11 to transmit hardware interpretable data to the driver 130 in a cyclic manner. As a result, the controller 120 may manage the operations of S323 to S333 as a synchronous task thread.

In detail, the controller 120 calls a SyncRunInterrupt( ) function of the ThreadManager class 11 with respect to the HardwareManager class 7 (S320). In other words, the controller 120 may call a synchronous run interrupt function of the ThreadManager class 11 with respect to the HardwareManager class 7.

Next, the controller 120 calls a SyncRun( ) function of the HardwareManager class 7 with respect to the DriveManager class 8 (S323), and a SyncRun( ) function of the DriveManager class 8 with respect to the Drive class 9 (S325).

Next, the controller 120 calls a GetCommandValues( ) function of the Drive class 9 with respect to the ThreadSafeQueue class 12 (S326). In other words, the controller 120 may obtain a motion command from the ThreadSafeQueue class 12 corresponding to the synchronous run interrupt function. In other words, the controller 120 may obtain a motion command from the ThreadSafeQueue class 12 corresponding to the synchronous run interrupt function.

Since the GetCommandValues( ) function of the Drive class 9 is a response to the SyncRun( ) function of the DriveManager class 8, the GetCommandValues( ) function may be called at a certain time point. The certain time point may signify a certain cycle, and the GetCommandValues( ) function of the Drive class 9 may be called, for example, for each 500 microseconds.

As a result, the controller 120 may obtain the motion command stored in the ThreadSafeQueue class 12 in a certain cycle.

Next, the controller 120 calls a GenerateTxPacket( ) function of the Drive class 9 with respect to the Motor class 10 (S327).

Next, the controller 120 calls a DoTxRx( ) function of the HardwareManager class 7 with respect to the DriveManager class 8 (S329), a AnalyzeRxPacket( ) function of the DriveManager class 8 with respect to the Drive class 9 (S331), and a SetActualValue( ) function of the Drive class 9 with respect to the Motor class 10 (S333).

As a result, the controller 120 may store an actual value about the motor state in the Motor class 10 in a certain cycle. In other words, the controller 120 may cyclically transmit hardware interpretable data to the driver 130 based on the motion command.

Next, the driver 130 drives an operation of at least one hardware module based on the hardware interpretable data. In this case, the driver 130 may cyclically drive the operation of at least one hardware module based on the cyclically transmitted data.

The controller 120 may simultaneously execute a plurality of motion commands included in a motion command group. In this case, the driver 130 may simultaneously drive motions of at least one hardware module forming each of the robots.

According to the present exemplary embodiment, since the operations of S323 to S333 are synchronously performed, safety of a network is increased and consequently jitter is reduced so that improvement of performance such as repeatability may be expected.

According to the above-described exemplary embodiments, the motion of a robot may be controlled in the control layer.

In particular, in the control layer, the motions of at least one hardware module forming one robot may be simultaneously controlled, or the motions of hardware modules respectively forming a plurality of robots may be simultaneously controlled.

Furthermore, according to the above-described exemplary embodiments, a non-real time task and a real-time task for the control of a robot may be independently processed.

Furthermore, according to the above-described exemplary embodiments, an asynchronous task and a synchronous task for the control of a robot may be processed altogether or at the same time.

Furthermore, according to the above-described exemplary embodiments, while the amount of calculations is reduced, safety of a network is increased so that performance such as repeatability of a robot may be improved.

Furthermore, since a plurality of robots may be controlled by using one hardware, compared to an existing technology of using a plurality of hardware devices, effects of low heat, low hardware costs, and low power consumption may be expected.

The inventive concept can also be embodied as computer-readable codes on a computer-readable recording medium. The computer-readable recording medium is any data storage device that can store programs or data which can be thereafter read by a computer system.

Examples of the computer-readable recording medium include read-only memory (ROM), random-access memory (RAM), CD-ROMs, magnetic tapes, floppy disks, optical data storage devices, etc. Also, the computer-readable recording medium can be embodied in the form of a carrier wave (e.g., transmission through the Internet). The computer-readable recording medium can also be distributed over network coupled computer systems so that the computer-readable code is stored and executed in a distributive manner. Also, functional programs, codes, and code segments for accomplishing the present inventive concept can be easily construed by programmers skilled in the art to which the present inventive concept pertains.

At least one of the components, elements, modules or units represented by a block as illustrated in FIGS. 1-4 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like It should be understood that the exemplary embodiments described herein should be considered in a descriptive sense only and not for purposes of limitation. Descriptions of features or aspects within each embodiment should typically be considered as available for other similar features or aspects in other embodiments. While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A robot control system comprising:
   an interface configured to receive a user input;
   a controller configured to generate a motion command corresponding to the user input and a motion command group including the motion command, and generate hardware interpretable data by analyzing the motion command; and
   a driver configured to drive a motion of at least one hardware module based on the hardware interpretable data to be interpreted by the at least one hardware module,
   wherein a position of the at least one hardware module changes according to the motion command corresponding to the user input, and
   wherein the controlled generates the motion command and the motion command group in non-real time and the hardware interpretable data in real time.

2. The robot control system of claim 1, wherein the motion command comprises a final result value corresponding to the motion of the at least one hardware module.

3. The robot control system of claim 1, wherein the at least one hardware module forms one robot.

4. The robot control system of claim 1, wherein the motion command group comprises a plurality of motion commands,
   wherein the controller simultaneously performs the plurality of motion commands included in the motion command group, and
   wherein the driver simultaneously drives motions of at least one hardware module forming each of a plurality of robots.

5. The robot control system of claim 1, wherein the controller analyzes the motion command in a non-cyclic manner and generates the hardware interpretable data in a cyclic manner.

6. The robot control system of claim 5, wherein the motion command comprises a final result value of the motion of the at least one hardware module.

7. The robot control system of claim 5, wherein the at least one hardware module forms one robot.

8. The robot control system of claim 5, wherein the motion command group comprises a plurality of motion commands,
   wherein the controller simultaneously performs the plurality of motion commands included in the motion command group, and
   wherein the driver simultaneously drives motion of at least one hardware module forming each of a plurality of robots.

9. The robot control system of claim 5, wherein the controller calls an asynchronous run interrupt function to analyze the motion command in a non-cyclic manner.

10. The robot control system of claim 9, wherein the controller stores the motion command according to the asynchronous run interrupt function.

11. The robot control system of claim 10, wherein the controller calls a synchronous run interrupt function to generate the hardware interpretable data in a cyclic manner, and obtains the motion command according to the synchronous run interrupt function.

12. The robot control system of claim 11, wherein the controller transmits the hardware interpretable data to the driver based on the motion command in a cyclic manner.

13. A robot control method of controlling a robot, the method comprising:
   receiving, by an interface, a user input through the interface;
   generating, by a controller, a motion command corresponding to the user input and a motion command group comprising the motion command;
   generating, by the controller, hardware interpretable data by analyzing the motion command; and
   driving, by a driver, a motion of at least one hardware module based on the hardware interpretable data, wherein the generating comprises:
 changing a position of the at least one hardware module according to the motion command corresponding to the user input, and
 generating the motion command and the motion command group in non-real time and the hardware interpretable data in real time.

14. The robot control method of claim 13, wherein the motion command is analyzed in a non-cyclic manner, and the hardware interpretable data is generated in a cyclic manner.

15. The robot control method of claim 13, further comprising:
 simultaneously performing a plurality of motion commands included in the motion command group, and
 simultaneously driving motions of at least one hardware module forming each of a plurality of robots.

16. The robot control method of claim 13, wherein the motion command comprises a final result value corresponding to the motion of the at least one hardware module.

17. The robot control method of claim 13, wherein the generating the hardware interpretable data by analyzing the motion command comprises:
 calling an asynchronous run interrupt function; and
 storing the motion command according to the asynchronous run interrupt function.

18. The robot control method of claim 17, wherein the generating o the hardware interpretable data by analyzing the motion command comprises:
 calling a synchronous run interrupt function; and
 obtaining the motion command according to the synchronous run interrupt function.

19. The robot control method of claim 18, further comprising transmitting the hardware interpretable data to the driver based on the motion command in a cyclic manner.

* * * * *